US009753512B2

(12) United States Patent
Tsai et al.

(10) Patent No.: US 9,753,512 B2
(45) Date of Patent: Sep. 5, 2017

(54) ELECTRONIC DEVICE AND METHOD FOR RECOGNIZING OUTPUT POWER OF POWER SUPPLY THEREOF

(71) Applicant: ASUSTeK COMPUTER INC., Taipei (TW)

(72) Inventors: Ming-Ting Tsai, Taipei (TW); Wei-Chen Tu, Taipei (TW); Yi-Ming Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 102 days.

(21) Appl. No.: 14/620,189

(22) Filed: Feb. 12, 2015

(65) Prior Publication Data

US 2015/0362973 A1 Dec. 17, 2015

(30) Foreign Application Priority Data

Jun. 11, 2014 (CN) .......................... 2014 1 0257586

(51) Int. Cl.
*G06F 1/32* (2006.01)
*G06F 1/26* (2006.01)

(52) U.S. Cl.
CPC ............ *G06F 1/266* (2013.01); *G06F 1/3203* (2013.01); *G06F 1/324* (2013.01)

(58) Field of Classification Search
CPC ................................. G06F 1/266; G06F 1/324
USPC ....................................................... 713/322
See application file for complete search history.

(56) References Cited

U.S. PATENT DOCUMENTS

| 6,163,143 | A | * | 12/2000 | Shimamori | ........... H02M 3/157 323/284 |
| 6,169,681 | B1 | * | 1/2001 | Kemp, III | ............. H02M 3/337 363/134 |
| 7,170,259 | B2 | | 1/2007 | Veselic | |
| 7,358,703 | B2 | | 4/2008 | Veselic | |
| 9,092,048 | B1 | * | 7/2015 | Owen | ........................ G06F 1/00 |
| 2004/0104757 | A1 | * | 6/2004 | Vargas | ................ H04L 25/0278 327/334 |

(Continued)

FOREIGN PATENT DOCUMENTS

| CN | 1574541 | 2/2005 |
| CN | 202737504 | 2/2013 |

(Continued)

*Primary Examiner* — Jaweed A Abbaszadeh
*Assistant Examiner* — Volvick DeRose
(74) *Attorney, Agent, or Firm* — Jianq Chyun IP Office

(57) ABSTRACT

An electronic device and a method for recognizing output power of a power supply thereof are provided. The electronic device includes a host and a power supply. The power supply is coupled to the host, receives an input power and converts the input power to a supplied power. The power supply transmits the supplied power to the host, and loads a notification signal to the supplied power in at least a time period. The acknowledge signal is a periodic clock signal, and corresponds to the output power of the power supply. The power supply loads the acknowledge signal to the supplied power in one or more time periods, and transmits the acknowledge signal to the corresponding host. The host can get the output power of the power supply via the acknowledge signal, which can improve efficiency and security of the supplied power.

11 Claims, 4 Drawing Sheets

400

(56) References Cited

U.S. PATENT DOCUMENTS

| | | | | |
|---|---|---|---|---|
| 2004/0251878 A1* | 12/2004 | Veselic | | H02J 7/00 320/141 |
| 2005/0134321 A1* | 6/2005 | Ede | | G06F 1/3203 327/1 |
| 2006/0208668 A1* | 9/2006 | Shimizu | | H05B 41/2856 315/309 |
| 2007/0108938 A1 | 5/2007 | Veselic | | |
| 2010/0049997 A1* | 2/2010 | Tu | | G06F 1/26 713/300 |
| 2010/0188116 A1* | 7/2010 | Iizuka | | H03K 19/01754 326/30 |
| 2011/0292693 A1* | 12/2011 | Niijima | | H02M 3/33507 363/21.17 |
| 2012/0051562 A1* | 3/2012 | Kim | | H04R 3/00 381/122 |
| 2013/0062967 A1* | 3/2013 | Teggatz | | H01F 38/14 307/104 |
| 2013/0178995 A1* | 7/2013 | Ree | | G06Q 50/06 700/295 |
| 2013/0253720 A1* | 9/2013 | Luo | | G06F 1/26 700/295 |
| 2013/0320947 A1* | 12/2013 | Noh | | G06F 1/26 323/283 |
| 2014/0028246 A1 | 1/2014 | Martynowski et al. | | |
| 2014/0112033 A1* | 4/2014 | Lin | | H02M 7/02 363/44 |
| 2014/0159490 A1* | 6/2014 | Cheng | | H02M 1/00 307/52 |
| 2014/0159687 A1* | 6/2014 | Lee | | H02M 3/1588 323/282 |
| 2014/0159696 A1* | 6/2014 | Han | | H02M 3/33576 323/311 |
| 2014/0334197 A1* | 11/2014 | Zhao | | H02M 3/33553 363/21.07 |

FOREIGN PATENT DOCUMENTS

| | | |
|---|---|---|
| CN | 202889197 | 4/2013 |
| CN | 103715901 | 4/2014 |
| TW | 201342768 | 10/2013 |

\* cited by examiner

ELECTRONIC DEVICE AND METHOD FOR RECOGNIZING OUTPUT POWER OF POWER SUPPLY THEREOF

CROSS-REFERENCE TO RELATED APPLICATION

This application claims the priority benefit of China application serial no. 201410257586.X, filed on Jun. 11, 2014. The entirety of the above-mentioned patent application is hereby incorporated by reference herein and made a part of this specification.

BACKGROUND OF THE INVENTION

Field of the Invention

The invention relates to an electronic device and, more particularly, to an electronic device with a power supply.

Description of the Related Art

With the rapid change of electronic products, usage time of the electronic product is increased. Thus, the supplied power for charging an electronic product quickly is required. A power adaptor with a universal serial bus (USB) which can provide a large current or a high voltage while charging, so as to increase a charging rate of the electronic product.

There are varies power adaptors with USB interface in the market, and varies output power specifications are applied even the power adaptors are produced by the same manufacturer. However, the different output power of the power adaptor may be regarded as the same by the electronic product (such as a tablet computer or a smart phone). Therefore, the charging efficiency is low.

BRIEF SUMMARY OF THE INVENTION

An electronic device which can recognize an output power of a power supply is provided, and the efficiency and security of the power supply are improved.

A method for recognizing an output power of a power supply is provided to improve the efficiency and security of the power supply.

An electronic device includes a host and a power supply. The power supply is coupled to the host, receives an input power and converts the input power to generate a supplied power. The power supply transmits the supplied power to the host, and loads a notification signal to the supplied power in at least a time period. The acknowledge signal is a periodic clock signal and corresponds to the output power of the power supply.

A method for recognizing an output power of a power supply includes following steps: receiving an input power and converting the input power to generate the supplied power; transmitting the supplied power to a host and loading the acknowledge signal to the supplied power in at least a time period. The acknowledge signal is a periodic clock signal and corresponds to the output power of the power supply.

As stated above, the power supply loads the acknowledge signal to the supplied power in one or more time periods, and transmits the acknowledge signal to the corresponding host. The host gets the output power of the power supply via the received notification signal, and thus the efficiency and security of the supplied power are improved.

These and other features, aspects and advantages of the present invention will become better understood with regard to the following description, appended claims, and accompanying drawings.

DETAILED DESCRIPTION OF THE EMBODIMENTS

Figure 1:
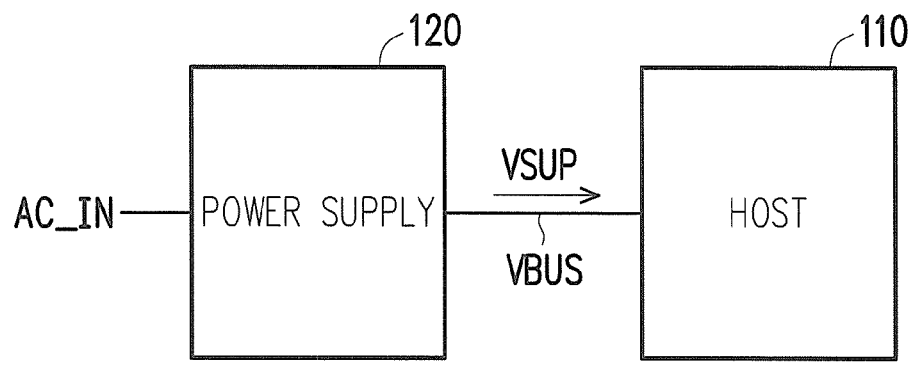
FIG. 1 is a schematic diagram showing an electronic device in an embodiment.

FIG. 1 is a schematic diagram showing an electronic device in an embodiment. The electronic device 100 includes a host 110 and a power supply 120. The host 110 receives a supplied power VSUP from the power supply 120 via a power supply bus VBUS. The power supply bus VBUS may be a USB.

The power supply 120 receives an input power AC_IN, and converts the input power AC_IN to generate the supplied power VSUP. Moreover, the power supply 120 loads the acknowledge signal to the supplied power VSUP, and informs the host 110 which receives the supplied power VSUP of the power supply 120 via the acknowledge signal.

Figure 2:
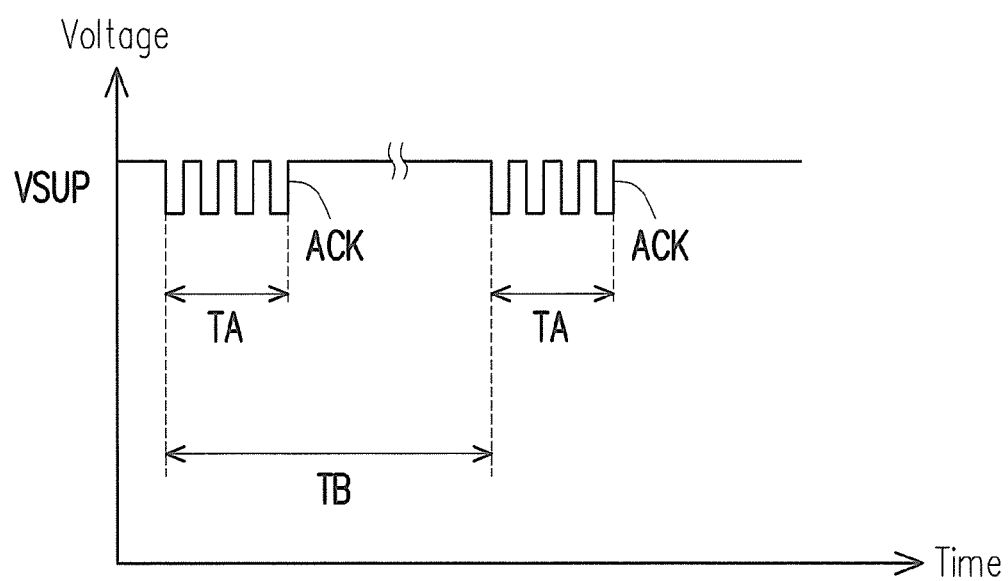
FIG. 2 is a waveform graph showing a supplied power VSUP in an embodiment.

The power supply 120 loads the acknowledge signal to the supplied power VSUP in a specified time period. Please refer to FIG. 1 and FIG. 2, FIG. 2 is a waveform graph showing the supplied power VSUP in an embodiment. In the time period TA, the acknowledge signal ACK is loaded to the supplied power VSUP with a stable direct voltage. The acknowledge signal ACK may be a periodic clock signal, and the amplitude of the acknowledge signal ACK is much smaller than the voltage of the supplied power VSUP. Additionally, the frequency of the acknowledge signal ACK can represent the output power of the power supply 120. For example, the power supply with different output power specifications can generate the acknowledge signal ACK of different frequencies, as shown in table 1:

TABLE 1

| Frequency of acknowledge signal ACK | Output power of power supply |
|---|---|
| 400 Hz | 2 A |
| 600 Hz | 1.2 A |
| 1 KHz | 1 A |

TABLE 1 is an embodiment, which is not used to limit the scope of the invention. The relation between the output power of the power supply and the frequency of the acknowledge signal can be defined by users, which is not limited herein.

The host 110 receives the acknowledge signal ACK from the supplied power VSUP, determines the frequency of the acknowledge signal ACK, and then compares with TABLE 1 to get the output power (the output current) of the power supply 120. Then, the host 110 operates corresponding to the output current of the power supply 120, so as to improve the charging efficiency and security. The content of TABLE 1 can be stored in a storage device of the host 110. For example, the TABLE 1 is stored in the host 110 in a form of a look up table (LUT). When the host 110 should determine the output power of the power supply 120, it can look up the TABLE 1 according to the frequency of the acknowledge signal ACK.

The acknowledge signal ACK may be generated once in the time period TB, or it can also be generated periodically with the time period TB. In order to ensure that the determination of the acknowledge signal ACK by the host 110 is correct, the acknowledge signal ACK may be loaded to the supplied power VSUP periodically, and the acknowledge signal ACK is transmitted to the host 110 repeatedly to ensure that the host 110 receives the correct acknowledge signal ACK.

The host 110 may also get the output power specification of the power supply 120 via different electrical parameters of the acknowledge signal ACK. For example, the host 110 can determine the output power of the power supply 120 via a duty cycle or an amplitude of the acknowledge signal ACK.

Figure 3:
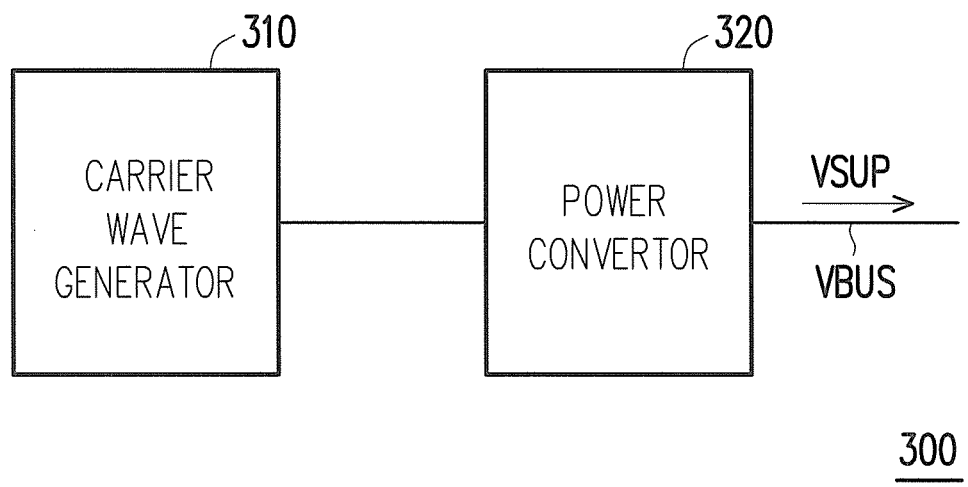
FIG. 3 is a schematic diagram showing a power supply in an embodiment.

FIG. 3 is a schematic diagram showing a power supply in an embodiment. The power supply 300 includes a carrier generator 310 and a power convertor 320. The carrier generator 310 is coupled to the power convertor 320. The power convertor 320 generates the supplied power VSUP and transmits the supplied power VSUP via the power supply bus VBUS. The power convertor 320 can convert the power according to a feedback voltage from the feedback circuit. The carrier generator 310 loads the acknowledge signal to the supplied power VSUP by adjusting the impedance at the terminal of the feedback circuit which provides the feedback voltage. In detail, in the time period of loading the acknowledge signal, the carrier generator 310 can periodically adjust the impedance at the terminal of the feedback circuit which provides the feedback voltage. Thus, the voltage of the supplied power VSUP generated by the power convertor 320 changes periodically corresponding to the change of the impedance, and the acknowledge signal is loaded to the supplied power VSUP.

Figure 4:
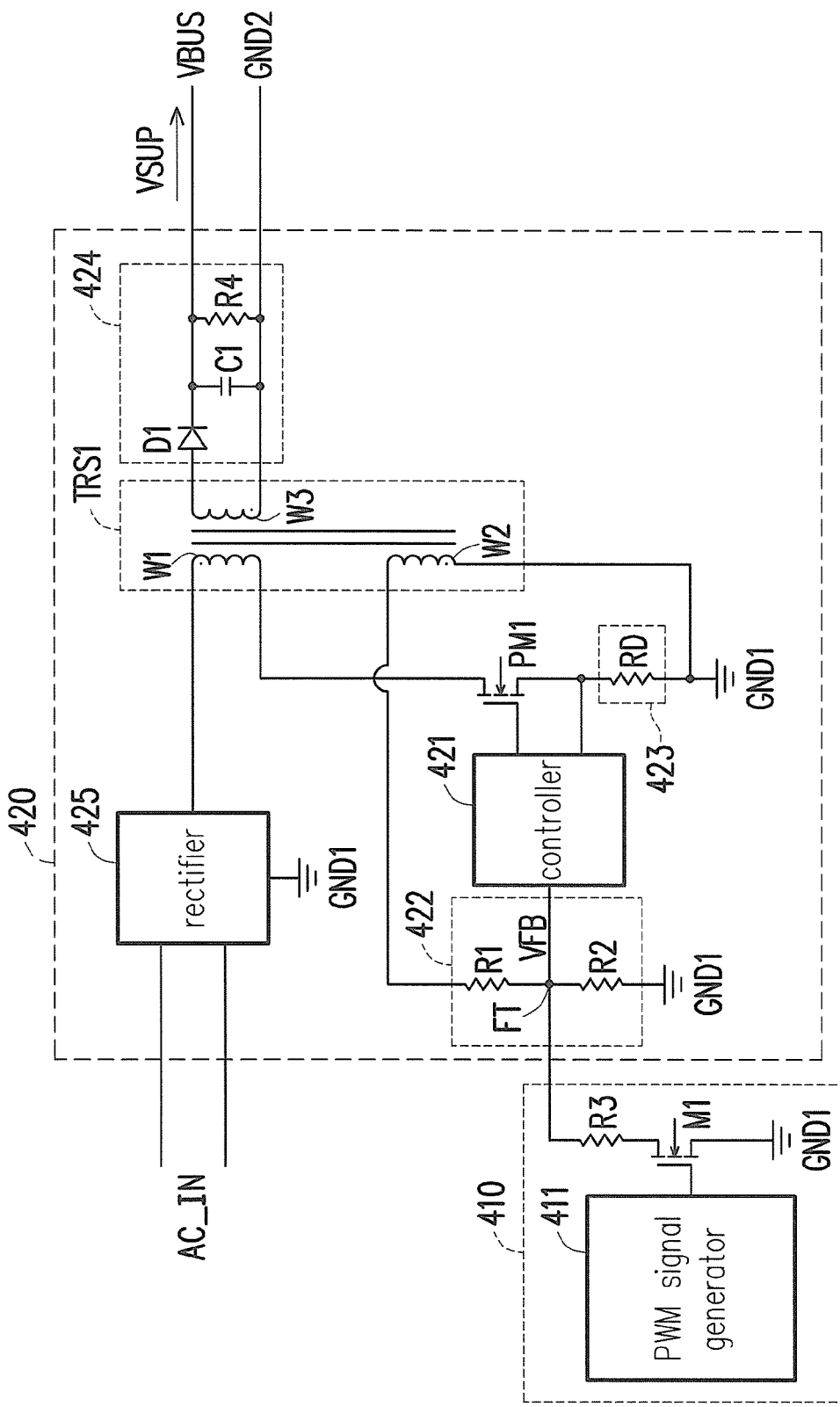
FIG. 4 is a schematic diagram showing a power supply in another embodiment.

FIG. 4 is a schematic diagram showing a power supply in another embodiment. The power supply 400 includes a carrier generator 410 and a power convertor 420. The power convertor 420 includes a transformer TRS1, a power transistor PM1, a controller 421, a feedback circuit 422, a current detector 423, an output stage circuit 424 and a rectifier 425. The transformer TRS1 includes a primary side and a secondary side. The primary side of the transformer TRS1 includes windings W1 and W2, and the secondary side of the transformer TRS1 includes a winding W3. Two terminals of the winding W1 are coupled to an output end of the rectifier 425 and a first end of the power transistor PM1, respectively. Two terminals of the winding W2 are coupled to the first reference ground GND1 and the feedback circuit 422, respectively. The winding W3 is coupled to the output stage circuit 424.

The current detector 423 is connected between a second end of the power transistor PM1 and the first reference ground GND1 in series, and it generates a current detecting signal by detecting the current flowing between the first end and the second end of the power transistor PM1. The controller 421 is coupled to the feedback circuit 422 to receive the feedback voltage VFB, and the controller 421 is coupled to the current detector 423 to receive the current detecting signal. The controller 421 generates a control signal according to the feedback voltage VFB and the current detecting signal, and controls the power transistor PM1 to be conducted or not via the control signal.

In detail, the rectifier 425 receives and rectifies the input power AC_IN, and transmits the rectified input power AC_IN to the winding W1. The power transistor PM1 is conducted or not according to the control signal, and executes a voltage conversion on the input power AC_IN. The output stage circuit 424 receives the voltage change at the winding W3 while the voltage at the coupled winding W1 changes, and generates the supplied power VSUP at the power supply bus VBUS.

Moreover, the winding W2 generates the feedback voltage VFB according to the voltage change coupled by the winding W3 and the dividing voltage of the feedback circuit 422. The feedback circuit 422 includes resistors R1 and R2 which are connected to each other in series. The resistor R1 is coupled between the winding W2 and the controller 421, and the resistor R2 is coupled between the controller 421 and the first reference ground GND1. The feedback voltage VFB is provided at a terminal FT between the resistors R1 and R2, and it is transmitted to the controller 421.

Furthermore, the current detector 423 includes a resistor RD. The resistor RD is connected between the second end of the power transistor PM1 and the first reference ground GND1 in series. The output stage circuit 424 includes a diode D1, a capacitor C1 and a resistor R4. A positive end of the diode D1 is coupled to the winding W3, and a negative end of the diode D1 is coupled to the power supply bus VBUS. The capacitor C1 is coupled between the negative end of the diode D1 and the second reference ground GND2. The resistor R4 is coupled between the negative end of the diode D1 and the second reference ground GND2.

The carrier generator 410 is coupled to the terminal FT between the resistor R1 and the resistor R2. In other words, the feedback circuit 422 provides the feedback voltage VFB to the terminal FT of the controller 421. The carrier generator 410 includes a pulse width modulation (PWM) signal generator 411, a resistor R3 and a switch which includes a transistor M1. The resistor R3 is connected between the controller 421 and the first end of the transistor M1 in series. The control end of the transistor M1 is coupled to the PWM signal generator 411 to receive the PWM signal, and the second end of the transistor M1 is coupled to the first reference ground GND1.

In the time period of loading the acknowledge signal, the PWM signal generator 411 provides the PWM signal to the control end of the transistor M1 periodically, and the transistor M1 is conducted or not periodically. When the transistor M1 is conducted, the resistor R3 is connected to the resistor R2 in parallel, the impedance at the terminal FT relative to the first reference ground GND1 is adjusted (which means the impedance is reduced), and the supplied power VSUP at the power supply bus VBUS is increased. When the transistor M1 is open, the impedance at the terminal FT relative to the first reference ground GND1 restores to the original value (which means the impedance equals to the resistance R2), and the supplied power VSUP at the power supply bus VBUS restores to the original voltage. Thus, the controller 421 can adjust the switching of the power transistor PM1 according to the periodical change of the impedance at the terminal FT relative to the first reference ground GND1. Thus, the voltage of the supplied power VSUP changes periodically and the acknowledge signal is loaded.

The frequency of the acknowledge signal may be determined according to the frequency of the PWM signal provided by the PWM signal generator 411. The frequency of the PWM signal may correspond to the output power of the power supply 400.

Figure 5:
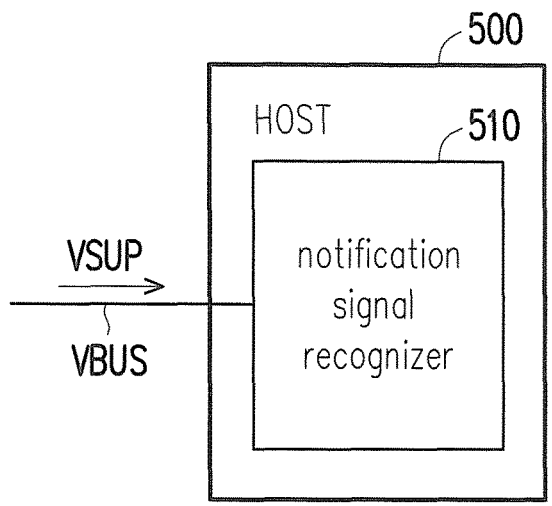
FIG. 5 is a schematic diagram showing a host of an electronic device in an embodiment.

FIG. 5 is a schematic diagram showing a host of an electronic device in an embodiment. The host 500 includes an acknowledge signal recognizer 510. The acknowledge signal recognizer 510 is coupled to the power supply bus VBUS and receives the supplied power VSUP. The acknowledge signal recognizer 510 can filter out the direct current of the supplied power VSUP to obtain the acknowledge signal which is loaded to the supplied power VSUP. Then, the acknowledge signal recognizer 510 detects the frequency of the acknowledge signal and then obtains the output power of the power supply accordingly. Thus, the received supplied power VSUP can be efficiently utilized via the host 500, and the charging efficiency and security can be improved.

Figure 6:
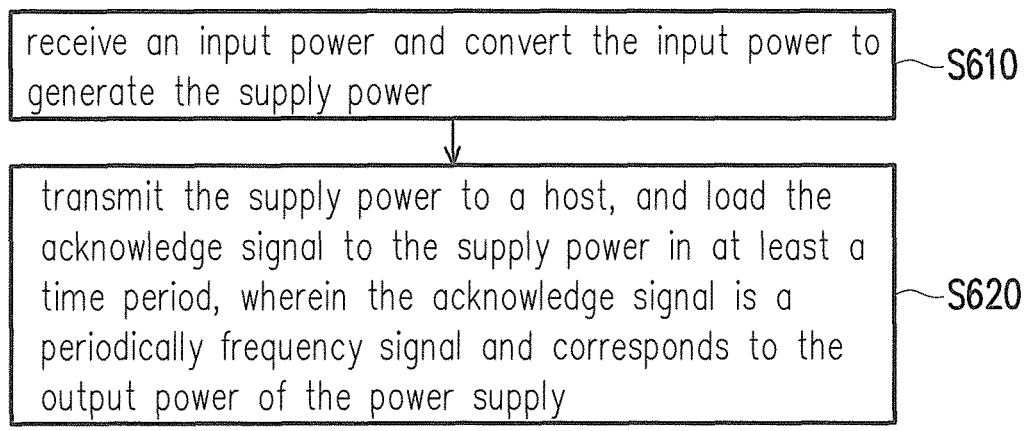
FIG. 6 is a flow chart showing a method for recognizing an output power of a power supply in an embodiment.

FIG. 6 is a flow chart showing a method for recognizing an output power of a power supply in an embodiment. In step S610, the input power is received and the input power is converted to generate the supplied power. In step S620, the supplied power is transmitted to the host, and the acknowledge signal is loaded to the supplied power in at least one time period. The acknowledge signal is a periodic clock signal and corresponds to the output power of the power supply.

The details of the steps are illustrated in the previous embodiments, which is omitted herein.

In sum, the power supply loads the acknowledge signal to the supplied power, and the output power specification of the power supply is informed to the host via the acknowledge signal. Thus, the host of the electronic device can precisely get the output power of the connected power supply, and the supplied power provided by the power supply can be efficiently utilized, so as to improve the whole efficiency of the system.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device comprising:
   a host; and
   a power supply coupled to the host, including:
      a power convertor configured to receive an input power and convert the input power to generate a supplied power and transmit the supplied power via a power supply bus according to a feedback voltage of a feedback circuit; and
      a carrier generator coupled to the power convertor, configured to periodically adjusts an impedance at a terminal of the feedback circuit which provides the feedback voltage in at least one time period, and makes the power convertor load an acknowledge signal via the power supply bus to be carried on the supplied power,
   wherein the acknowledge signal is a periodic clock signal and corresponds to an output power of the power supply.

2. The electronic device according to claim 1, wherein the host gets the output power of the power supply according to a frequency of the acknowledge signal.

3. The electronic device according to claim 1, wherein the carrier generator includes:
   a pulse width modulation (PWM) signal generator generating a PWM signal;
   a resistor coupled to the feedback circuit; and
   a switch connected between the resistor and a first reference ground in series, wherein the switch is conducted or not according to the PWM signal.

4. The electronic device according to claim 1, wherein the power convertor includes:
   a transformer including a first winding and a second winding disposed at a primary side and a third winding disposed at a secondary side, wherein a first end of the first winding receives the input power, a first end of the second winding is coupled to the first reference ground, a first end of the third winding is coupled to a second reference ground, and the feedback circuit is coupled to a second end of the second winding and divides a voltage at the second end of the second winding to generate the feedback voltage;
   a power transistor, wherein a first end of the power transistor is coupled to the second end of the first winding;
   a controller generating a control signal according to the feedback voltage and a current detecting signal, and transmitting the control signal to a control end of the power transistor;
   a current detector connected between a second end of the power transistor and the first reference ground in series, wherein the current detector detects current between the first end and the second end of the power transistor to generate the current detecting signal; and
   an output stage circuit coupled to the third winding to generate the supplied power.

5. The electronic device according to claim 4, wherein the feedback circuit includes:
   a first resistor, wherein a first end of the first resistor is coupled to the second end of the second winding; and
   a second resistor connected between a first end of the first resistor which generates the feedback voltage and the first reference ground in series.

6. The electronic device according to claim 4, wherein the current detector includes:
   a resistor connected between the second end of the power transistor and the first reference ground in series.

7. The electronic device according to claim 4, wherein the output stage circuit includes:
   a diode, wherein a positive end of the diode is coupled to the second end of the third winding;
   a capacitor coupled between a negative end of the diode and the second reference ground; and
   a resistor coupled between the negative end of the diode and the second reference ground,
   wherein the negative end of the diode generates the supplied power.

8. The electronic device according to claim 4, wherein the power convertor further includes:
   a rectifier connected at a path of the first winding receiving the input power.

9. The electronic device according to claim 1, wherein the host includes:
   a notification signal recognizer receiving the supplied power, and recognizing the acknowledge signal in at least one of the time periods, wherein the acknowledge signal recognizer gets the output power of the power supply according to the acknowledge signal.

10. A method for recognizing an output power of a power supply of an electronic device comprising following steps:
   receiving an input power and converting the input power to generate a supplied power according to a feedback voltage of a feedback circuit; and transmitting the supplied power to a host via a power supply bus;

adjusting an impedance at a terminal of the feedback circuit which provides the feedback voltage periodically in at least one of time periods and loading an acknowledge signal via the power supply bus to be carried on the supplied power in the at least one time period, wherein the acknowledge signal is a periodic clock signal and corresponds to the output power of the power supply.

11. The recognizing method according to claim 10, wherein the method further includes:

obtaining the output power of the power supply according to a frequency of the acknowledge signal.

* * * * *